United States Patent [19]

Kitaoka et al.

[11] 4,347,223

[45] Aug. 31, 1982

[54] APPARATUS FOR MAKING SUPPLY OF HIGH PRESSURE LIQUID AND RELIEF OF PRESSURE OF THE SAME

[75] Inventors: Yoji Kitaoka, Ichihara; Mizuho Hirato, Hitachi; Kazuo Miyatani, Tokyo, all of Japan

[73] Assignee: Agency of Industrial Science and Technology, Tokyo, Japan

[21] Appl. No.: 193,079

[22] Filed: Oct. 2, 1980

[30] Foreign Application Priority Data

Oct. 18, 1979 [JP] Japan .................................. 54-133599

[51] Int. Cl.³ ............................. B01J 3/02; B01J 8/00; F04F 11/02
[52] U.S. Cl. .................................... 422/242; 222/249; 417/92; 422/261
[58] Field of Search ............... 422/208, 242, 310, 261; 141/258, 1; 222/249, 129.2, 1; 201/31; 417/122–124, 92, 93, 95

[56] References Cited

U.S. PATENT DOCUMENTS 3,306,216 2/1967 Warman .................................. 417/92
3,556,682 1/1971 Sakamoto et al. .................... 417/122
4,112,047 9/1978 Donaldson.

*Primary Examiner*—Bradley Garris
*Attorney, Agent, or Firm*—Armstrong, Nikaido, Marmelstein & Kubovcik

[57] ABSTRACT

An apparatus for effectively making the supply of material slurry at a high pressure into a high-pressure liquefaction reaction vessel and relief of the pressure of the high-pressure product slurry to permit the discharge of the product slurry as a low-pressure slurry. At least one cylinder having a float therein is used. The material slurry is charged at a low pressure into the cylinder from one end of the latter. Then, the high-pressure product slurry after the reaction is charged from the other end of this cylinder or another cylinder so that the material slurry is pressurized and forcibly supplied to the reaction vessel by the high pressure possessed by the high-pressure product slurry. On the other hand, the high-pressure product slurry, which has been relieved from the high pressure, is forced out of the system at a low pressure as a next batch of material slurry is charged into the cylinder from the above-mentioned one end of the cylinder, so that the product slurry is collected as a low-pressure slurry.

1 Claim, 3 Drawing Figures

FIG.I
PRIOR ART

APPARATUS FOR MAKING SUPPLY OF HIGH PRESSURE LIQUID AND RELIEF OF PRESSURE OF THE SAME

BACKGROUND OF THE INVENTION

The present invention relates to an apparatus for effectively making the supply of material liquid and relief of pressure of reaction product liquid in high-pressure liquefaction reaction process.

A conventional direct liquefaction process for coal will be explained hereinunder. A material slurry supplied to the slurry tank is delivered by a high-pressure slurry pump to a high-pressure reaction vessel. The slurry liquefied in this high-pressure reaction vessel is discharged to the outside of the system through a reducing valve. In this case, the product slurry after the reaction is a high-pressure slurry containing product oil, unliquified coal, ash content and heavy metals. The taking out of the product, i.e. pressure release of the high-pressure product slurry, is made through a reducing valve. The product slurry is relieved from the high pressure taking a form of a continuous jet flow, causing a rapid wear of the valve thus shortening the life of the latter. Since the high pressure of the product slurry is relieved as the slurry is jetted through the reducing valve which acts as a throttling valve, the pressure energy is lost and the power or energy is not recovered.

In addition, in this known system, the slurry pump is required to transport the material slurry of a high concentration at a high pressure, imposing various technical difficulties.

The invention aims at obviating the above-stated problems or shortcomings of the prior art which can be summarized as follows.

(1) Since the reaction is made at a high pressure, it is necessary to transport the slurry at a high pressure, which in turn necessitates a slurry pump operable at the high pressure.

(2) Since the pressure relief of the product slurry discharged from the reaction vessel is made by discharging the slurry as a continuous jet through a pressure reducing valve, wear of the pressure reducing valve grows rapidly.

(3) Since the pressure of the product slurry is lowered as the slurry flows through the pressure reducing valve, the energy possessed by the product slurry of the high pressure is lost without being recovered.

As a result of an intense study for obviating these problems, the present inventors have found out that the high-pressure slurry pump can be eliminated by feeding the material slurry into the reaction vessel making use of the energy possessed by the high-pressure product slurry discharged from the reaction vessel. The pressure of the product slurry is relieved after the energy of the pressure is effectively used for forcibly feeding the material slurry into the reaction vessel. In this manner, the product slurry can be collected as a low-pressure slurry, and the continuous jetting flow of the product slurry, which would cause a rapid wear of the pressure reducing valve, does not take place.

BRIEF SUMMARY OF THE INVENTION

The invention provides an improved apparatus for efficiently supplying the material slurry at a high pressure and taking out the product slurry as a low pressure slurry after a relief of the pressure, in a process for treating the material slurry in a high-pressure liquefaction reaction vessel, in such a manner as to eliminate the loss of energy and to avoid the wear of the pressure reducing valve.

According to the invention, at least one cylinder having a float therein is used. The cylinder is charged with a material slurry from one end thereof at a low pressure. Then, the high-pressure product slurry after the reaction is charged through another end of this cylinder or through another cylinder, so that the material slurry is forced out by the high pressure of the product slurry and forcibly supplied into the reaction vessel, while the pressure of the product slurry charged into the cylinder is relieved. Thereafter, the next batch of material slurry is charged from the above-mentioned one end of the cylinder at a low pressure so as to force the product slurry out of the system for the collection of the product slurry.

DESCRIPTION OF THE PREFERRED EMBODIMENTS

Figure 1:
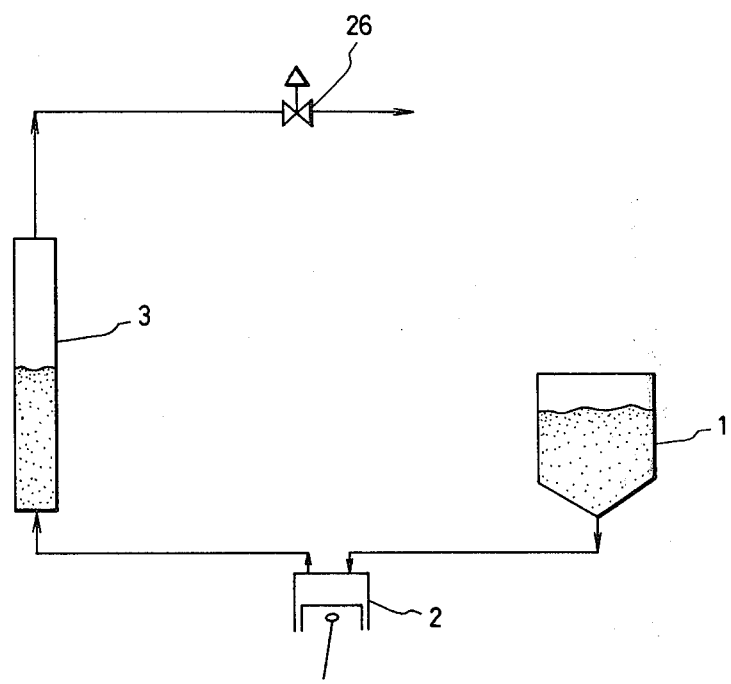
FIG. 1 is a system diagram of a conventional apparatus for making the supply of a high-pressure liquid and relief of high-pressure.

FIG. 1 is a system diagram of a conventional apparatus for supplying a material slurry at a high pressure to a reaction vessel and relief of the high pressure of the product slurry after the reaction. Referring to FIG. 1, the material slurry stored in a slurry tank 1 is delivered to a high-pressure reaction vessel 3 by means of a high-pressure slurry pump 2. The product slurry liquefied in the reaction vessel 3 is discharged out of the system through a pressure reducing valve 26. In this case, the product slurry after the reaction is a high-pressure slurry containing product oil, unliquified coal, ash content and heavy metals. The taking out of the product, i.e. the relief of the high pressure of the product slurry, is made through the pressure reducing valve 26, by allowing the high-pressure product slurry to flow through the pressure reducing valve as a continuous jet, so that the pressure reducing valve is worn out soon to deteriorate the durability of the same.

This problem, however, is overcome by the invention as will be understood from the following description.

Figure 2:
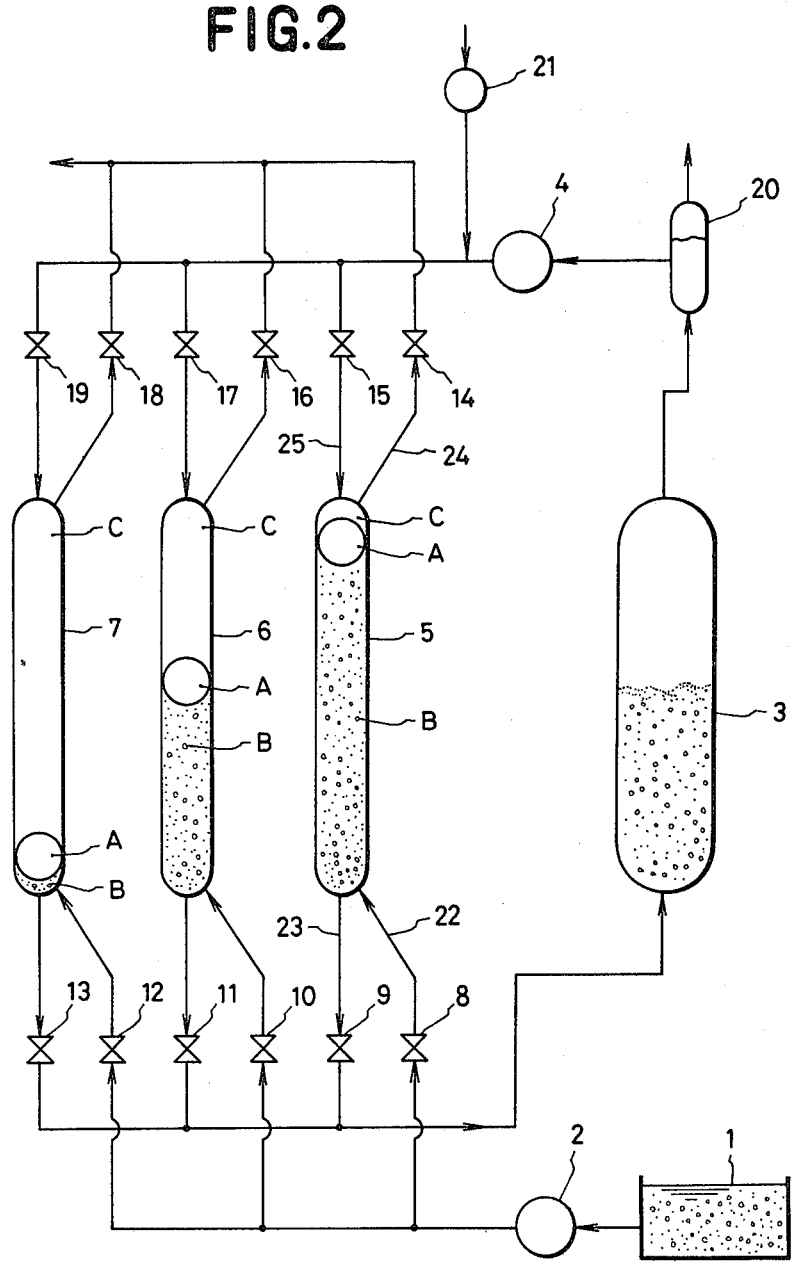
FIG. 2 is a system diagram of an apparatus of the invention for making the supply of a high-pressure liquid and relief of high pressure.

Referring to FIG. 2 showing a system diagram of the apparatus of the invention, the system is constituted by a slurry tank 1, low-pressure slurry pump 2, high-pressure reaction vessel 3, low-pressure pump 4, cylinders (slurry supplying device) 5, 6, 7, valves 8–19, gas separator 20 and a supply pump 21. Among these constituents, essential are the pumps 2 and 4, at least one of the cylinder, e.g. cylinder 5, four conduits necessary for the connection, e.g., conduits 22–25 and the valves such as valves 8, 9, 14, 15. Each cylinder 5–7 has two separate working chambers B and C separated from each other by means of the movable float A.

To one end of each cylinder, e.g. cylinder 5, connected are an introduction pipe 22 for introducing the material slurry and having a material slurry introduction valve 8, and a material slurry discharge pipe 23 for delivering the material slurry to the reaction vessel 3 and provided with a discharge valve 9. To the other end of the cylinder separated from the first-mentioned end by the float A, connected are a discharge pipe 24 having a relief valve 14 for relieving the pressure of the product slurry, and a product slurry introduction pipe 25 having an introduction valve 15.

This system operates in a manner as explained hereinunder.

As to the cylinder 5, FIG. 2 shows a state of the end of the third step in which the material slurry is charged in the working chamber B at a low pressure and the float A is moved to the upper end of its stroke. The valves 8 and 14 are closed after the completion of the charge.

First step: Valves 9 and 15 are opened. Gas is removed from the high-pressure product slurry discharged from the high-pressure reaction vessel 3, by means of the gas separator 20, and a pressure corresponding to the pressure loss in the reaction is applied to the product slurry. The product slurry is then introduced into the working chamber C through the valve 15 and the introduction pipe 25. In consequence, the float A is depressed and moved downwardly to force out the material slurry from the working chamber B to the high-pressure reaction vessel 3 through the discharge pipe 23 and the valve 9. After the supply of the material slurry to the reaction vessel 3, the valves 9 and 15 are closed. Thus, the material slurry is forcibly charged into the reaction vessel by making an efficient use of the pressure possessed by the high-pressure slurry discharged from the reaction vessel.

Second step: The valve 14 is opened to relieve the pressure in the working chambers B and C. This pressure relief is only to relieve the pressure of the liquid, and no jetting out of the slurry takes place. The valve 8 is then opened.

Third step: A new batch of material slurry is charged into the working chamber B at a low pressure by means of a low-pressure slurry pump 2. Since the pressure of the product slurry in the working chamber C has been relieved already, the material slurry can be charged at a low pressure. The float A is moved upward by the charging pressure and the product slurry is discharged from the working chabmer C to the next step (to the outside of the system) at a low pressure of, for example, 2 to 3 atm.

The above stated steps 1 to 3 are repetitionally performed by a plurality of cylinders with a suitable phase difference, so that the supply of the material slurry and the relief of the pressure are made continuously.

Figure 3:
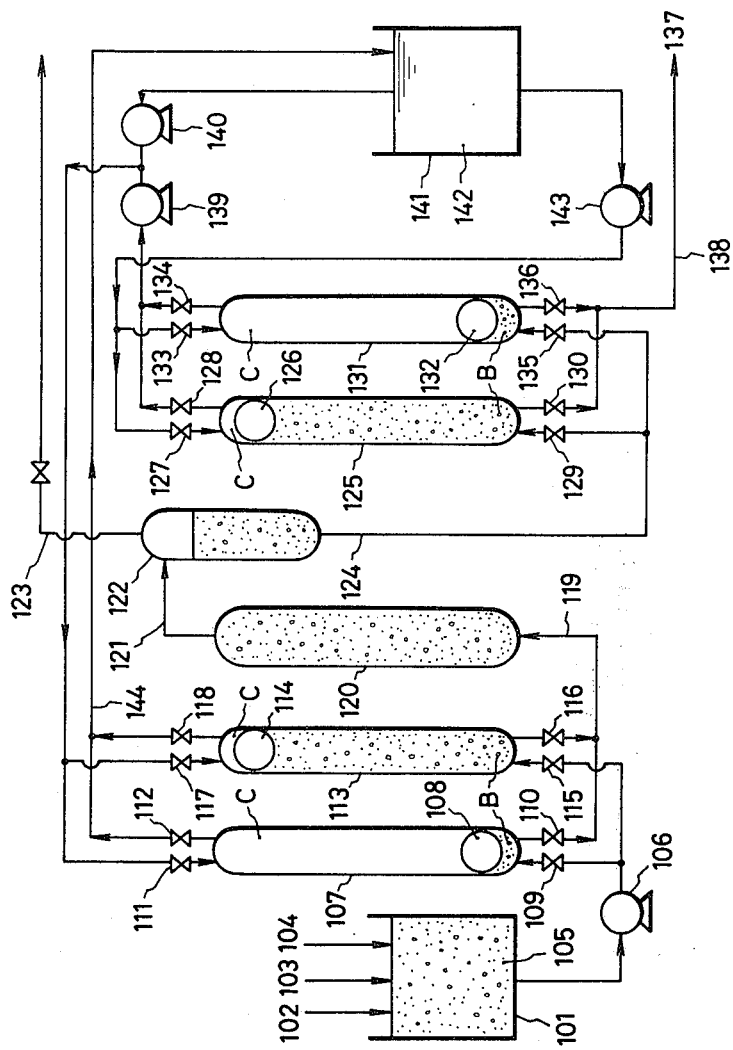
FIG. 3 is a system diagram of an apparatus of another embodiment of the invention for making the supply of a high-pressure liquid and relief of high pressure.

FIG. 3 shows a system diagram of another embodiment of the invention. While in the first embodiment shown in FIG. 2 the high-pressure product slurry is directly introduced into the cylinder after the separation of the gas, in the second embodiment shown in FIG. 3, the cylinder is divided into a first and a second cylinders with a driving liquid interposed therebetween, so that the material slurry is pressurized through the driving liquid as the product liquid is introduced into the second cylinder.

Referring to FIG. 3, each of the first cylinders 107 and 113 for supplying the material slurry is divided by a float into two chambers B and C. Also, each of second cylinders 125 and 131 for recovering the pressure energy of the product slurry is divided into two chambers B and C by means of a float. Although two pairs of cylinders are shown, it is possible to use only one pair of the cylinders, if it is allowed to supply and discharge the slurry intermittently. In addition, in order to eliminate the pulsation of the slurry pressure during the supply thereof, it is possible to use three pairs of cylinders with suitable phase difference.

The system shown in FIG. 3 applies, by way of example, to the high-pressure liquefaction reaction for coal, and operates in a manner to be explained hereinafter.

A suitable amount of coal 102, catalyst 103 and a solvent or a heavy oil 104 are put into a material slurry tank 101 and are mixed and stirred to prepare a material slurry 105. The material slurry is then pressurized to 2 to 3 atm by means of a low-pressure slurry pump 106, and is introduced into the chamber B of one of alternating first cylinders 107 and 113 by alternatingly switching the first cylinder introduction valves 109 and 115. Then, the selected driving liquid introduction valve 111 or 117 is opened to introduce the high-pressure driving liquid 142 which has been fed from a later-mentioned step into the chamber C of the first cylinder so as to pressurize the material slurry of a low pressure in the chamber B by means of the selected float 108 or 114. Thereafter, the appropriate discharge valve 110 or 116 is opened so that the pressurized material slurry is supplied at a high pressure into a coal liquefaction reaction vessel 120. Valves 109, 115, 112 and 118 are kept closed in this state.

In the reaction vessel 120, a predetermined temperature is maintained for a predetermined period so as to proceed reactions such as thermal decomposition, hydrogenation decomposition, extraction of solvent and so forth thereby to liquefy the coal. The reactions take place at a high pressure so that the product slurry is discharged at a high pressure.

The high-pressure product slurry discharged from the reaction vessel 120 is introduced to a gas separator 122 where the product gas is separated. The separated gas is discharged to the outside of the system through the line 123.

On the other hand, the high-pressure product slurry from which the gas has been separated is introduced into the chamber B of the desired second cylinder 125 or 131 through the line 124 and via the appropriate valve 129 or 135, so as to pressurize the low-pressure driving liquid in the chamber C of the selected second cylinder 125 or 131 through the movement of the float 126 or 132. The pressurized driving liquid then flows through the selected valve 128 or 134 and is pressurized by an auxiliary pump 139 by an amount to make up for the pressure loss, and is fed into the chamber C of the next-in-use first cylinder 107 or 113 through the appropriate valve 111 or 117 of the first cylinder so as to pressurize the low-pressure material slurry in the chamber B of the first cylinder through the action of the aforementioned float 108 or 114.

As one of valves 112 and 118 is opened, the pressurized driving liquid in the chamber C of the first cylinder is released and returned to a driving liquid tank 141 through a line 144. The driving liquid 142 is fed into chamber C of the next-in-use second cylinder 125 or 131 at a low pressure by means of a low-pressure pump 143 via selected valves 127 or 133. At the same time, one of valves 130 and 136 is opened to relieve the pressure of the product slurry which is then collected as a low-pressure product slurry 137 through a line 138.

The decrease of the volume of the slurry due to the separation of the gas, i.e. the unbalance of volume between the material slurry and the product slurry, can be overcome by the small-capacity pump 140 adapted to make up for the driving liquid 142.

The method and apparatus of the invention offers the following advantages.

(1) The pressure of the high-pressure product slurry discharged from the high-pressure reaction vessel is effectively used as the power for supplying the material slurry at a high pressure. Therefore, the high-pressure slurry pump can be omitted if a low-pressure pump is used to compensate for the loss of pressure.

(2) The relief of pressure of the high-pressure product slurry coming out from the high-pressure reaction vessel is not made by a continuous discharge of slurry through a pressure reducing valve but by merely opening the valve after a gas separation to relieve the pressure of the liquid to permit the collection of the product slurry at a low pressure. Therefore, the jetting flow of the slurry which would cause a rapid wear of the valve is avoided.

(3) In supplying the material slurry of high concentration at a high pressure to the reaction vessel, only a small pressure difference corresponding to the pressure provided by the low-pressure pump exists across the float of the cylinder. In addition, the high-pressure side of the cylinder is charged with the product slurry of low concentration or the driving liquid. Therefore, the wear of the inner surface of the cylinder and the wear of the float are advantageously suppressed.

What is claimed is:

1. Apparatus for use in high-pressure liquefaction reaction processes of the type in which a material slurry is supplied under a high pressure into a high-pressure liquefaction reaction vessel through utilization of the pressure possessed by a high-pressure product slurry from the high-pressure liquefaction reaction vessel and, at the same time, a product slurry is put for a pressure relief and taken out as a low-pressure product, which comprises:

a high-pressure liquefaction reaction vessel;

at least one cylinder having a float therein;

a low-pressure slurry pump for supplying under a low pressure a material slurry into said cylinder;

a material slurry introduction pipe having a valve and connecting between said low-pressure slurry pump and a lower end of said cylinder;

a material slurry discharge pipe for guiding under a high pressure a material slurry from said cylinder to said high-pressure liquefaction reaction vessel, said material slurry discharge pipe having a valve and connecting between a lower end portion of said cylinder and the high-pressure liquefaction reaction vessel;

a product slurry introduction pipe for guiding under a high pressure a product slurry from said high-pressure liquefaction reaction vessel to said cylinder, said product slurry introduction pipe being connected to an upper end portion of said cylinder through said high-pressure liquefaction reaction vessel, a gas separator for separating gas out of the product slurry, a pump operative to compensate for a pressure loss due to the reaction and a valve; and a product slurry discharge pipe for recovering under a low pressure a product slurry from an upper end portion of said cylinder, said product slurry discharge pipe including a valve and being adapted to release the pressure of the high pressure product slurry introduced into said cylinder and recover the pressure released product slurry upon the introduction of the material slurry into the lower end of said cylinder by said low-pressure slurry pump.

* * * * *